C. S. BRADLEY.
UTILIZING NATURAL HEAT.
APPLICATION FILED APR. 7, 1908.
995,219.
Patented June 13, 1911.
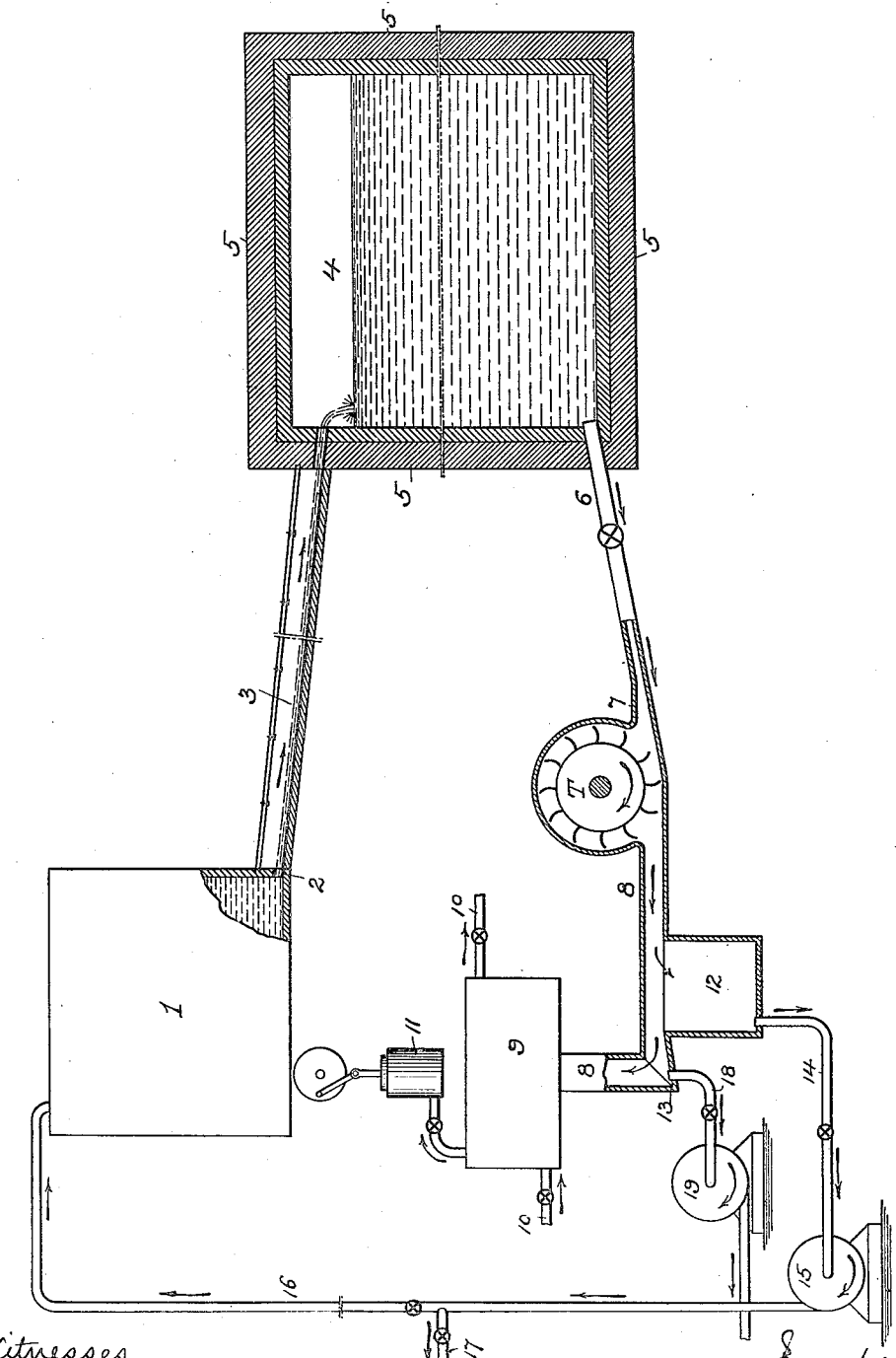

UNITED STATES PATENT OFFICE.

CHARLES S. BRADLEY, OF NEW YORK, N. Y., ASSIGNOR TO SUN POWER COMPANY, OF CAMDEN, NEW JERSEY, A CORPORATION OF NEW JERSEY.

UTILIZING NATURAL HEAT.

995,219.  Specification of Letters Patent.  Patented June 13, 1911.

Application filed April 7, 1908. Serial No. 425,769.

*To all whom it may concern:*

Be it known that I, CHARLES S. BRADLEY, a citizen of the United States, residing in the borough of Manhattan, New York city, New York, have invented certain Improvements in Utilizing Natural Heat, of which the following is a specification.

The main object of my invention is to provide a method of utilizing solar heat and means for use in practicing said method, both of which are simpler and more economical than any heretofore known.

Other objects and advantages of my invention will be apparent from the following description of the invention in detail and the particular features of novelty will be pointed out in the claims.

Heretofore in attempting to utilize the heat of the sun for the production of power it has been customary to first heat a body of water by exposure to the solar rays, and then to employ the water thus heated as an agency for applying heat to a second body of liquid of a lower boiling point and to operate an engine by the vapor of this second liquid. Such systems, however, have the disadvantage of being complex and involve the extra step of transferring heat from the water to the liquid of lower boiling point. In carrying out my invention, I overcome this objectionable feature of previous systems and directly utilize the heat of the water for the production of power by converting the available heat energy of the mass into energy of velocity and opposing to such converted energy a rotatable resistance medium. This is accomplished preferably by delivering the heated water through an expanding nozzle to the inlet side of a turbine engine and maintaining reduced pressure at the exhaust side of the engine by any suitable means, the result being that as the heated water passes through the expanding nozzle its available heat is converted into velocity and a partial boiling under the reduced pressure takes place, the mass which strikes the blades of the rotary disk of the engine being virtually a mixture of steam and finely divided water, which is heavier than steam and has, consequently, greater effectiveness than steam as an operating medium for the engine.

A further important improvement which my invention is peculiarly adapted to attain is the production of a concentrated solution from sea water or other water having one or more salts in solution therein, such water having a higher boiling point than fresh water and having, therefore, a greater thermo-dynamic efficiency and correspondingly greater availability for use in carrying out my invention independently of the economies arising from the recovering in crystalline form of the salt or salts contained in the water. This latter result is accomplished, as will hereinafter appear, by separating the water from the steam delivered by the engine until a concentrated solution is obtained, which may be drawn off and treated in any known manner to precipitate its salt. By condensing the steam, moreover, fresh water is obtained, and my invention is therefore of especial value for use in localities where the water supply is salt or where, for other reasons, it is not potable in its natural state.

To clearly illustrate my invention, I shall describe the same with reference to a specific embodiment of the invention which will serve as an example of its main features, although the invention should not be considered as limited to the details shown in this embodiment.

Said drawing shows partly in elevation and partly in vertical section, a system in which the heated water can be used directly, and by which if desired, the salt water can be separated from fresh water.

In said drawing 1 may indicate what I shall term the waste tank, in which the water to be heated may be supposed to be kept. The term "waste tank" is intended to imply a receptacle for either continually supplied water from an external source or the return water from the turbine, or a supply derived from both of these sources. In the lower portion of said waste tank 1 is a slot or other suitable form of outlet 2, which permits the water from the waste tank to flow upon the bed 3 where it is exposed to the rays of the sun. This bed may be constructed in different ways, but I prefer to provide it with a cover composed of one or more layers of glass, in order that the water flowing over the bed may be exposed to the direct and unconcentrated rays of the sun, and to otherwise provide against loss of heat by reason or radiation, conduction or convection.

The bed should provide a water passage of such length that the water has time to receive and absorb the desired amount of heat from the sun's rays, and the admission of water to this bed must be also in suitable quantity for this purpose. After the water has run down the bed 3, it is preferably led into a carefully insulated cistern or reservoir 4, which we may assume is under ground, and inclosed in a layer 5 of material which is a non-conductor or a poor conductor of heat. This cistern or reservoir 4 should be of considerable size so that the quantity of heated water which it may contain may be considerable, although the temperature may or may not be especially high, less, in fact, than the boiling point, since the generation of steam is to be avoided, because of the great increase of its volume, as compared with that of water, and the consequent impracticability of storing the same and maintaining its heat.

The ample size of the cistern or reservoir 4 will permit of the storage of such a quantity of heated water that the turbine can be operated during intervals when the sun's rays are not available. From a suitable part of this cistern or reservoir the heated water may be led through a pipe 6 into an expanding nozzle 7 where the conversion of the available heat of the mass into mass velocity, and the water into a homogeneous mixture of steam and finely divided water, takes place. From the expanding nozzle 7 this mass discharges upon the buckets of the turbine T, and thus imparts its energy to the work shaft. From the exhaust side of the turbine an exhaust pipe 8 leads to a condenser 9 which is supplied with a suitable condensing medium through pipes 10, and from which the air is constantly withdrawn by any suitable air pump 11. The water exhaustion is maintained by a suitable pump or pumps as will be described.

The system here illustrated may serve for the use of either fresh or salt water. If sea water or other saline solution is used, it may, if desired, be concentrated by the system to raise its boiling point. For the purpose of concentrating the solution and also for obtaining fresh water, the exhaust pipe 8 is provided with a trap 12 in which the unevaporated and consequently salty portion of the water will be caught. The steam or fresh portion passes over this trap 12 and into the condenser 9 where it is condensed and drips down into the depression 13 in the exhaust pipe 8. From the bottom of the salt water trap 12 a pipe 14 leads to the intake of a suitable water pump 15, preferably of the rotary type, which returns the salt water by pipe 16 to the waste tank 1 and thus maintains the exhaustion. By repeating this cycle it is obvious the water becomes more and more concentrated until finally a concentrated solution is obtained. The pipe 16 may be provided with an external discharge pipe 17, so that when a valve therein is opened the salt water will be discharged externally instead of being returned to the waste tank, in which case the salt water may be run into a salt separator of any suitable type to obtain the salt.

From the depression 13 in the exhaust pipe 8 a pipe 18 leads to the intake of a water pump 19, preferably of the rotary type, which discharges the fresh water externally and thus also assists in maintaining the exhaustion. The pipe 18 is provided with a suitable valve which is open when the fresh water is to be separated, but at other times is closed. When closed the fresh water pump is not in operation and the fresh water which is condensed and caught in the depression 13 runs over and again mixes with the salt water in the salt water trap 12, or if fresh water only is used, the condensed portion mixes with the unevaporated portion which was caught in the trap 12. From there the entire mass of water may be returned to the waste tank and used repeatedly, as where water is scarce, or it may be discharged externally by the pipe 17 described above, where water is continually supplied from an external source.

I claim:

1. The method of utilizing natural heat which consists in heating water by exposure to the direct and unconcentrated rays of the sun, restricting or preventing the loss of heat during such heating operation, converting the available heat energy of the heated mass into energy of velocity, and opposing to such converted energy a rotatable resistance medium.

2. The method of utilizing natural heat which consists in heating water by exposure to the direct and unconcentrated rays of the sun, restricting or preventing loss of heat during such heating operation, converting the available heat energy of the heated water into energy of velocity at reduced pressure, opposing to such converted energy a rotatable resistance medium, separating the vaporous from the liquid portions of the resulting mass, and then reheating the liquid portion as before and continuing the cycle of operations.

3. The method of utilizing natural heat which consists in heating water by exposure to the direct and unconcentrated rays of the sun, restricting or preventing loss of heat during such heating operation, converting the available heat energy of the water into energy of velocity at reduced pressure, opposing to such converted energy a rotatable resistance medium, separating the liquid from the vaporous portions of the resulting mass, condensing said vapors, and then reheating both liquid bodies as before and continuing the cycle of operations.

4. The method of utilizing natural heat which consists in heating water by exposure to the direct and unconcentrated rays of the sun, restricting or preventing loss of heat during such operation, converting the available heat energy of the heated water into energy of velocity at reduced pressure, opposing to such converted energy a rotatable resistance medium, separating the liquid from the vaporous portions of the resultant mass, withdrawing the air from and condensing said vapors, and then reheating the liquid bodies as before and continuing the cycle of operations.

5. The method of utilizing natural heat which consists in heating water by exposure to the direct and unconcentrated rays of the sun, restricting or preventing the loss of heat during such heating operation, accumulating and storing the heated water, withdrawing successive volumes of the same, converting the available heat energy of such successive volumes, into energy of velocity, and opposing to such converted energy a rotatable resistance medium.

6. The method of utilizing natural heat which consists in heating water by exposure to the direct and unconcentrated rays of the sun, restricting or preventing loss of heat during such heating operation, accumulating and storing the heated water, withdrawing successive volumes of the same, converting the available heat energy of such successive volumes into energy of velocity at reduced pressure, opposing to such converted energy a rotatable resistance medium, separating the vaporous from the liquid portions of the resulting mass, and then reheating the liquid portion as before and continuing the cycle of operations.

7. The method of utilizing natural heat which consists in heating water by exposure to the direct and unconcentrated rays of the sun, restricting or preventing loss of heat during such heating operation, accumulating and storing the heated water, withdrawing successive volumes of the same, converting the available heat energy of such successive volumes into energy of velocity at reduced pressure, opposing to such converted energy a rotatable resistance medium, separating the liquid from the vaporous portions of the resulting mass, condensing said vapors, and then reheating both liquid bodies as before and continuing the cycle of operations.

8. The method of utilizing natural heat which consists in heating water by exposure to the direct and unconcentrated rays of the sun, restricting or preventing loss of heat during such operation, accumulating and storing the heated water, withdrawing successive volumes of the same, converting the available heat energy of such successive volumes, into energy of velocity at reduced pressure, opposing to such converted energy a rotatable resistance medium, separating the liquid from the vaporous portions of the resultant mass, withdrawing the air from and condensing said vapors, and then reheating the liquid bodies as before and continuing the cycle of operations.

9. The method of utilizing natural heat which consists in heating water by exposure to the direct and unconcentrated rays of the sun, restricting or preventing the loss of heat during such heating operation, accumulating and storing the heated water, preventing or restricting loss of heat by the stored mass, withdrawing successive volumes of the same, converting the available heat energy of such successive volumes into energy of velocity, and opposing to such converted energy a rotatable resistance medium.

10. The method of utilizing natural heat which consists in heating water by exposure to the direct and unconcentrated rays of the sun, restricting or preventing loss of heat during such heating operation, accumulating and storing the heated water, preventing or restricting loss of heat by the stored mass, withdrawing successive volumes of the same, converting the available heat energy of such successive volumes into energy of velocity at reduced pressure, opposing to such converted energy a rotatable resistance medium, separating the vaporous from the liquid portions of the resulting mass, and then reheating the liquid portion as before and continuing the cycle of operations.

11. The method of utilizing natural heat which consists in heating water by exposure to the direct and unconcentrated rays of the sun, restricting or preventing loss of heat during such heating operation, accumulating and storing the heated water, preventing or restricting loss of heat by the stored mass, withdrawing successive volumes of the same, converting the available heat energy of such successive volumes into energy of velocity at reduced pressure, opposing to such converted energy a rotatable resistance medium, separating the liquid from the vaporous portions of the resulting mass, condensing said vapors, and then reheating both liquid bodies as before and continuing the cycle of operations.

12. The method of utilizing natural heat which consists in heating water by exposure to the direct and unconcentrated rays of the sun, restricting or preventing loss of heat during such operation, accumulating and storing the heated water, preventing or restricting loss of heat by the stored mass, withdrawing successive volumes of the same, converting the available heat energy of such successive volumes, into energy of velocity at reduced pressure, opposing to such converted energy a rotatable resistance medium, separating the liquid from the vaporous portions of the resultant mass, withdrawing the air from and condensing said vapors, and then reheating the liquid bodies as before and continuing the cycle of operations.

13. The method of utilizing natural heat which consists in heating, by exposure to the rays of the sun, a mass of water having a salt or salts in solution therein, converting the available heat energy of the mass into energy of velocity at reduced pressure, opposing to such converted energy a rotatable resistance medium, separating the unevaporated portion of the resultant mass from the evaporated portion, and repeating the cycle of operations with the unevaporated portion of the mass.

14. The method of utilizing natural heat which consists in heating, by exposure to the rays of the sun, a mass of water having a salt or salts in solution therein, converting the available heat energy of the mass into energy of velocity at reduced pressure, opposing to such converted energy a rotatable resistance medium, separating the unevaporated portion of the mass from the evaporated portion, condensing the evaporated portion of the mass, and repeating the cycle of operations with the unevaporated portion of the mass.

15. The method of utilizing natural heat which consists in heating, by exposure to the rays of the sun, a mass of water having a salt or salts in solution therein, expanding the mass and thereby evaporating a portion of it, separating the evaporated portion from the mass and thus concentrating the salt solution, reëxposing the mass of concentrated solution to the rays of the sun, again expanding it, and thus converting the available heat energy of the mass into energy of velocity, and opposing to such converted energy a rotatable resistance medium.

16. The method of utilizing natural heat which consists in progressively exposing to the direct and unconcentrated rays of the sun successive volumes of a mass of water having a salt or salts in solution therein, preventing or restricting loss of heat by the mass during such heating operation, converting the available heat energy of the mass into energy of velocity at reduced pressure, opposing to such converted energy a rotatable resistance medium, separating the unevaporated portion of the resultant mass from the evaporated portion, condensing the evaporated portion of the mass, and repeating the cycle of operations with the unevaporated portion of the mass.

17. The method of utilizing natural heat which consists in progressively heating by exposure to the direct and unconcentrated rays of the sun successive volumes of a mass of water having a salt or salts in solution therein, preventing or restricting loss of heat by said mass during the heating operation, accumulating and storing the mass thus heated, withdrawing successive volumes of said mass and converting the available heat energy of the same into energy of velocity at reduced pressure, opposing to such converted energy a rotatable resistance medium, separating the unevaporated portion of the mass from the evaporated portion, and repeating the cycle of operations with the unevaporated portion of the mass.

18. The method of utilizing natural heat which consists in progressively heating by exposure to the direct and unconcentrated rays of the sun successive volumes of a mass of water having a salt or salts in solution therein, preventing or restricting loss of heat by said mass during the heating operation, accumulating and storing the mass thus heated, withdrawing successive volumes of said mass and converting the available heat energy of the same into energy of velocity at reduced pressure, opposing to such converted energy a rotatable resistance medium, separating the unevaporated portion of the mass from the evaporated portion, condensing the evaporated portion of the mass, and repeating the cycle of operations with the unevaporated portion of the same.

19. The method of utilizing natural heat which consists in progressively exposing to the direct and unconcentrated rays of the sun successive volumes of a mass of water having a salt or salts in solution therein, preventing or restricting loss of heat by the stored mass, withdrawing successive volumes of said stored mass, converting the available heat energy thereof into energy of velocity at reduced pressure, opposing to said converted energy a rotatable resistance medium, separating the unevaporated portion of the mass from the evaporated portion of the same, and repeating the cycle of operations with the unevaporated portion of the mass.

20. The method of utilizing natural heat which consists in progressively exposing to the direct and unconcentrated rays of the sun successive volumes of a mass of water having a salt or salts in solution therein, preventing or restricting loss of heat by the stored mass, withdrawing successive volumes of said stored mass, converting the available heat energy thereof into energy of velocity at reduced pressure, opposing to said converted energy a rotatable resistance medium, separating the unevaporated portion of the mass from the evaporated portion of the same, condensing the evaporated portion of the mass, and repeating the cycle of operations with the unevaporated portion of the same.

21. The method of utilizing natural heat which consists in flowing through a closed chamber, at atmospheric pressure, a body of water having a salt or salts in solution therein and during such flow exposing the water to the direct and unconcentrated rays of the sun whereby it absorbs heat energy from said rays and is increased in temperature at atmospheric pressure, expanding, under vacuum, the water thus heated and thereby converting its available heat energy into energy of velocity, opposing to such converted energy a rotatable resistance medium whereby such energy of velocity is further converted into kinetic energy, separating the evaporated portions of the resultant mass from the unevaporated portions, and repeating the cycle of operations with the unevaporated portions of the mass.

22. The method of utilizing natural heat which consists in flowing through a closed chamber, at atmospheric pressure, a body of water having a salt or salts in solution therein, and during such flow exposing the water to the direct and unconcentrated rays of the sun whereby it absorbs heat energy from said rays and is increased in temperature at atmospheric pressure, expanding, under vacuum, the water thus heated and thereby converting its available heat energy into energy of velocity, opposing to such converted energy a rotatable resistance medium whereby such energy of velocity is further converted into kinetic energy, separating the evaporated portions of the resultant mass from the unevaporated portions, condensing said evaporated portions of the mass, and repeating the cycle of operations with the unevaporated portions.

23. The method of utilizing natural heat which consists in flowing through an inclosed chamber, at atmospheric pressure, a body of water having a salt or salts in solution therein, and during such flow exposing the water to the direct and unconcentrated rays of the sun whereby it absorbs heat energy from said rays and is increased in temperature at atmospheric pressure, accumulating and storing at atmospheric pressure the water thus heated, exposing, under vacuum, successive limited volumes of water withdrawn from said stored mass and thereby converting the available heat energy of the same into energy of velocity, opposing to such converted energy a rotatable resistance medium and thereby further converting the energy of velocity into kinetic energy, separating from each other the evaporated and unevaporated portions of the resultant mass, and repeating the cycle of operations with the unevaporated portions of the mass.

24. The method of utilizing natural heat which consists in flowing through an inclosed chamber, at atmospheric pressure, a body of water having a salt or salts in solution therein, and during such flow exposing the water to the direct and unconcentrated rays of the sun whereby it absorbs heat energy from said rays and is increased in temperature at atmospheric pressure, accumulating and storing at atmospheric pressure the water thus heated, exposing, under vacuum, successive limited volumes of water withdrawn from said stored mass and thereby converting the available heat energy of the same into energy of velocity, opposing to such converted energy a rotatable resistance medium and thereby further converting the energy of velocity into kinetic energy, separating from each other the evaporated and unevaporated portions of the resultant mass, condensing the evaporated portions of the mass, and repeating the cycle of operations with the unevaporated portions of the same.

25. The combination of means for exposing a liquid mass to the rays of the sun and thereby heating the same, a turbine wheel, means for converting the available heat energy of the liquid mass into energy of velocity, means for causing said energy of velocity to act upon the turbine wheel to rotate the same, means for separating the evaporated and unevaporated portions of the resultant mass, and means for returning the unevaporated portions of the mass to the exposing means.

26. The combination of means for exposing a liquid mass to the rays of the sun and thereby heating the same, a turbine wheel, means for converting the available heat energy of the liquid mass into energy of velocity, means for causing said energy of velocity to act upon the turbine wheel to rotate the same, means for separating the evaporated and unevaporated portions of the resultant mass, means for condensing the evaporated portions of the mass, and means for returning the unevaporated portions of the mass to the exposing means.

27. The combination of means for exposing a liquid mass to the rays of the sun and thereby heating the same, means for accumulating and storing the mass thus heated, means for converting the available heat energy of the mass into energy of velocity, a turbine wheel, means for causing the energy of velocity to act upon said turbine wheel to rotate the same, means for separating the evaporated and unevaporated portions of the resultant mass, and means for returning the unevaporated portions of the mass to the exposing means.

28. The combination of means for exposing a liquid mass to the rays of the sun and thereby heating the same, means for accumulating and storing the mass thus heated, means for converting the available heat energy of the mass into energy of velocity, a turbine wheel, means for causing the energy of velocity to act upon said turbine wheel to rotate the same, means for separating the evaporated and unevaporated portions of the resultant mass, means for condensing the evaporated portions of the mass, and means for returning the unevaporated portions of the mass to the exposing means.

29. The combination of means for exposing a liquid mass to the rays of the sun and thereby heating the same, means for accumulating and storing the mass thus heated, means for preventing or restricting loss of heat by said stored mass, means for converting the available heat energy of the mass into energy of velocity, a turbine wheel, means for causing the energy of velocity to act upon said turbine wheel to rotate the same, means for separating the evaporated and unevaporated portions of the resultant mass, and means for returning the unevaporated portions of the mass to the exposing means.

30. The combination of means for exposing a liquid mass to the rays of the sun, and thereby heating the same, means for accumulating and storing the mass thus heated, means for preventing or restricting loss of heat by said stored mass, means for converting the available heat energy of the mass into energy of velocity, a turbine wheel, means for causing the energy of velocity to act upon said turbine wheel to rotate the same, means for separating the evaporated and unevaporated portions of the resultant mass, means for condensing the evaporated portions of the mass, and means for returning the unevaporated portions of the mass to the exposing means.

31. The combination of means for exposing a liquid mass to the rays of the sun and thereby heating the same, means for accumulating and storing the liquid mass thus heated, a turbine wheel, means for withdrawing from the stored mass of liquid successive and limited volumes thereof, means for converting the available heat energy of the same into energy of velocity, means for causing such energy of velocity to act upon the turbine wheel to rotate the same, means for separating from each other the evaporated and unevaporated portions of the resultant mass, and means for returning the unevaporated portions of the mass to the exposing means.

32. The combination of means for exposing a liquid mass to the rays of the sun and thereby heating the same, means for accumulating and storing the liquid mass thus heated, a turbine wheel, means for withdrawing from the stored mass of liquid successive and limited volumes thereof, means for converting the available heat energy of the same into energy of velocity, means for causing such energy of velocity to act upon the turbine wheel to rotate the same, means for separating from each other the evaporated and unevaporated portions of the resultant mass, means for condensing the evaporated portions of the mass, and means for returning the unevaporated portions of the same to the exposing means.

33. The combination of means for exposing a liquid mass to the rays of the sun and thereby heating the same, means for accumulating and storing the liquid mass thus heated, means for restricting or preventing loss of heat by said stored mass, a turbine wheel, means for withdrawing from the stored mass of liquid successive and limited volumes thereof, means for converting the available heat energy of the same into energy of velocity, means for causing such energy of velocity to act upon the turbine wheel to rotate the same, means for separating from each other the evaporated and unevaporated portions of the resultant mass, and means for returning the unevaporated portions of the mass to the exposing means.

34. The combination of means for exposing a liquid mass to the rays of the sun and thereby heating the same, means for accumulating and storing the liquid mass thus heated, means for restricting or preventing loss of heat by said stored mass, a turbine wheel, means for withdrawing from the stored mass of liquid successive and limited volumes thereof, means for converting the available heat energy of the same into energy of velocity, means for causing such energy of velocity to act upon the turbine wheel to rotate the same, means for separating from each other the evaporated and unevaporated portions of the resultant mass, means for condensing the evaporated portions of the mass, and means for returning the unevaporated portions of the same to the exposing means.

35. The combination of means for exposing a flowing body of liquid to the direct and unconcentrated rays of the sun, means for preventing or restricting loss of heat by said liquid during the heating operation, means for converting the available heat energy of the liquid into energy of velocity, a turbine wheel, means whereby the energy of velocity is caused to act upon said turbine wheel to rotate the same, means for separating the evaporated and unevaporated portions of the resultant mass, and means for returning the unevaporated portions to the exposing means.

36. The combination of means for exposing a flowing body of liquid to the direct and unconcentrated rays of the sun, means for preventing or restricting loss of heat by said liquid during the heating operation, means for converting the available heat energy of the liquid into energy of velocity, a turbine wheel, means whereby the energy of velocity is caused to act upon said turbine wheel to rotate the same, means for separating the evaporated and unevaporated portions of the resultant mass, means for condensing the evaporated portions of the resultant mass, and means for returning the unevaporated portions of the mass to the exposing means.

37. The combination of means for exposing a flowing body of liquid to the direct and unconcentrated rays of the sun, means for restricting or preventing loss of heat by the liquid during such heating operation, means for accumulating and storing the liquid thus heated, means for restricting or preventing loss of heat by said stored mass, means for converting the available heat energy of the liquid into energy of velocity, a turbine wheel, means whereby such energy of velocity is caused to act upon said turbine wheel to rotate the same, means for separating the evaporated and unevaporated portions of the resultant mass. and means for returning the unevaporated portions of the same to the exposing means.

38. The combination of means for exposing a flowing body of liquid to the direct and unconcentrated rays of the sun, means for restricting or preventing loss of heat by the liquid during such heating operation, means for accumulating and storing the liquid thus heated, means for restricting or preventing loss of heat by said stored mass, means for converting the available heat energy of the liquid into energy of velocity, a turbine wheel, means whereby such energy of velocity is caused to act upon said turbine wheel to rotate the same, means for separating the evaporated and unevaporated portions of the resultant mass, means for condensing the evaporated portions, of the mass, and means for returning the unevaporated portions of the mass to the exposing means.

39. The combination of means for exposing a flowing body of liquid to the direct and unconcentrated rays of the sun, means for restricting or preventing loss of heat by said liquid during the heating of the same, means for accumulating and storing the liquid thus heated, means for preventing or restricting loss of heat by said stored mass, a turbine wheel, means for withdrawing from the stored mass successive limited volumes of the same, means for converting the available heat energy of the same into energy of velocity, means for causing such energy of velocity to act upon the turbine wheel to rotate the same, means for separating the evaporated and unevaporated portions of the resultant mass, and means for returning the unevaporated portions of the mass to the exposing means.

40. The combination of means for exposing a flowing body of liquid to the direct and unconcentrated rays of the sun, means for restricting or preventing loss of heat by said liquid during the heating of the same, means for accumulating and storing the liquid thus heated, means for preventing or restricting loss of heat by said stored mass, a turbine wheel, means for withdrawing from the stored mass, successive limited volumes of the same, means for converting the available heat energy of the same into energy of velocity. means for causing such energy of velocity to act upon the turbine wheel to rotate the same, means for separating the evaporated and unevaporated portions of the resultant mass, means for condensing the evaporated portions of the mass, and means for returning the evaporated portions of the mass to the exposing means.

41. The combination, in apparatus for utilizing natural heat, of means for exposing a flowing body of liquid to the direct and unconcentrated rays of the sun and thereby heating said liquid, means for preventing or restricting loss of heat during such operation, a turbine wheel, and means for converting the available heat energy of the heated liquid into energy of velocity and causing said energy of velocity to act upon said turbine wheel to rotate the same.

42. The combination, in apparatus for utilizing natural heat, of means for exposing a flowing body of liquid to the direct and unconcentrated rays of the sun and thereby heating said liquid, means for preventing or restricting loss of heat during such operation, a turbine wheel, means for converting the available heat energy of the heated liquid into energy of velocity and causing said energy of velocity to act upon said turbine wheel to rotate the same, means for separating the liquid from the vaporous portions of the mass after it has acted upon said turbine wheel. means for condensing said vapors to liquid form, and means for returning both liquid bodies to the heater.

43. The combination, in apparatus for utilizing natural heat, of means for exposing a flowing body of liquid to the direct and unconcentrated rays of the sun and thereby heating said liquid, means for preventing or restricting loss of heat during such operation, a turbine wheel, means for converting the available heat energy of the heated liquid into energy of velocity and causing said energy of velocity to act upon said turbine wheel to rotate the same, means for separating the liquid from the vaporous portions of the resulting mass after it has acted upon the turbine wheel, means for withdrawing the air from the vapors, means for condensing the vapors to liquid form, and means for returning the liquid bodies to the heater.

44. The combination, in apparatus for utilizing natural heat, of means for exposing a flowing body of liquid to the direct and unconcentrated rays of the sun and thereby heating the same, means for preventing or restricting loss of heat during such operation, means for accumulating and storing the heated liquid, means for withdrawing from storage successive volumes of the heated liquid, and means for converting the available heat energy of said successive volumes of heated liquid into energy of velocity and causing said energy of velocity to act upon said turbine wheel to rotate the same.

45. The combination, in apparatus for utilizing natural heat, of means for exposing a flowing body of liquid to the direct and unconcentrated rays of the sun and thereby heating the same, means for preventing or restricting loss of heat during such operation, means for accumulating and storing the heated liquid, means for withdrawing from storage successive volumes of the heated liquid, means for converting the available heat energy of said successive volumes of the heated liquid, means for converting the available heat energy of said successive volumes of heated liquid into energy of velocity and causing said energy of velocity to act upon said turbine wheel to rotate the same, means for separating the liquid from the vaporous portions of the mass after it has acted upon said turbine wheel, means for condensing said vapors to liquid form, and means for returning both liquid bodies to the heater.

46. The combination, in apparatus for utilizing natural heat, of means for exposing a flowing body of liquid to the direct and unconcentrated rays of the sun and thereby heating the same, means for preventing or restricting loss of heat during such operation, means for accumulating and storing the heated liquid, means for withdrawing from storage successive volumes of the heated liquid, means for converting the available heat energy of said successive volumes of heated liquid into energy of velocity and causing said energy of velocity to act upon said turbine wheel to rotate the same, means for separating the liquid from the vaporous portions of the resulting mass after it has acted upon the turbine wheel, means for withdrawing the air from the vapors, means for condensing the vapors to liquid form, and means for returning the liquid bodies to the heater.

47. The combination, in apparatus for utilizing natural heat, of means for exposing a flowing body of liquid to the direct and unconcentrated rays of the sun and thereby heating the same, means for preventing or restricting loss of heat during such operation, means for accumulating and storing the heated liquid, means for restricting or preventing loss of heat thereby, means for withdrawing from storage successive volumes of the heated liquid, and means for converting the available heat energy of said successive volumes of heated liquid into energy of velocity and causing said energy of velocity to act upon said turbine wheel to rotate the same.

48. The combination, in apparatus for utilizing natural heat, of means for exposing a flowing body of liquid to the direct and unconcentrated rays of the sun and thereby heating the same, means for preventing or restricting loss of heat during such operation, means for accumulating and storing the heated liquid, means for restricting or preventing loss of heat thereby, means for withdrawing from storage successive volumes of the heated liquid, means for converting the available heat energy of said successive volumes of heated liquid into energy of velocity and causing said energy of velocity to act upon said turbine wheel to rotate the same, means for separating the liquid from the vaporous portions of the mass after it has acted upon said turbine wheel, means for condensing said vapors to liquid form, and means for returning the liquid bodies to the heater.

49. The combination, in apparatus for utilizing natural heat, of means for exposing a flowing body of liquid to the direct and unconcentrated rays of the sun and thereby heating the same, means for preventing or restricting loss of heat during such operation, means for accumulating and storing the heated liquid, means for restricting or preventing loss of heat thereby, means for withdrawing from storage successive volumes of the heated liquid, means for converting the available heat energy of said successive volumes of heated liquid into energy of velocity and causing said energy of velocity to act upon said turbine wheel to rotate the same, means for separating the liquid from the vaporous portions of the resulting mass after it has acted upon the turbine wheel, means for withdrawing the air from the vapors, means for condensing the vapors to liquid form, and means for returning the liquid bodies to the heater.

In testimony whereof, I have signed my name to this specification, in the presence of two subscribing witnesses.

CHARLES S. BRADLEY.

Witnesses:
C. H. ELDERD, Jr.,
RUSSELL C. JONES.